(12) United States Patent  
van Hillo et al.

(10) Patent No.: US 7,115,030 B2
(45) Date of Patent: Oct. 3, 2006

(54) APPARATUS FOR AUTOMATICALLY REMOVING A TAIL FROM POULTRY

(75) Inventors: Eric Adriaan van Hillo, Oostzaan (NL); Eric de Jong, Oostzaan (NL); Antonius Jozef Veraart, Oostzaan (NL)

(73) Assignee: Meyn Food Processing Technology, B.V., Oostzaan (NL)

( * ) Notice: Subject to any disclaimer, the term of this patent is extended or adjusted under 35 U.S.C. 154(b) by 0 days.

(21) Appl. No.: 10/877,957

(22) Filed: Jun. 25, 2004

(65) Prior Publication Data

US 2005/0048894 A1 Mar. 3, 2005

(30) Foreign Application Priority Data

Jun. 26, 2003 (NL) .................................... 1023752

(51) Int. Cl.
*A22C 21/00* (2006.01)
(52) U.S. Cl. ..................................................... 452/167
(58) Field of Classification Search ..................... None
See application file for complete search history.

(56) References Cited

U.S. PATENT DOCUMENTS

| | | | | |
|---|---|---|---|---|
| 3,744,087 A | * | 7/1973 | Vertegaal | ..................... 452/120 |
| 3,837,045 A | | 9/1974 | Blacker | |
| 4,118,829 A | * | 10/1978 | Harben, Jr. | .................. 452/120 |
| 4,131,973 A | * | 1/1979 | Verbakel | ...................... 452/117 |
| 4,245,372 A | | 1/1981 | Messner | |
| 4,639,973 A | * | 2/1987 | van der Eerden | ........... 452/167 |
| 4,811,458 A | * | 3/1989 | v.d. Nieuwelaar et al. | .... 452/90 |
| 5,026,317 A | * | 6/1991 | Kennedy | ..................... 452/106 |
| 5,069,652 A | * | 12/1991 | Hazenbroek | ................ 452/165 |
| 5,147,240 A | * | 9/1992 | Hazenbroek et al. | ........ 452/165 |
| 5,240,454 A | * | 8/1993 | Martin et al. | ................ 452/182 |
| 5,336,127 A | * | 8/1994 | Hazenbroek | ................. 452/160 |
| 6,383,069 B1 | * | 5/2002 | Volk et al. | .................. 452/188 |
| 6,398,636 B1 | * | 6/2002 | Jansen et al. | ............... 452/122 |
| 6,716,096 B1 | * | 4/2004 | Clark | ......................... 452/106 |

OTHER PUBLICATIONS

EPO Search Report.

* cited by examiner

*Primary Examiner*—Thomas Price
(74) *Attorney, Agent, or Firm*—Dority & Manning

(57) ABSTRACT

The invention relates to an apparatus for automatically removing a tail from poultry. An overhead conveyor moves the poultry or part of a bird suspended by the legs, and a guiding device is disposed underneath the overhead conveyor for supporting and guiding the poultry. A cutting device is functionally disposed behind a lead element for the poultry and which is part of the guiding device. The overhead conveyor is designed to convey the poultry with the back facing forward while the guiding device supports and guides the poultry substantially at the side of the back. The cutting device is disposed in or under an effective supporting surface of the guiding device.

7 Claims, 3 Drawing Sheets

APPARATUS FOR AUTOMATICALLY REMOVING A TAIL FROM POULTRY

FIELD OF THE INVENTION

The invention relates to an apparatus for automatically removing a tail from poultry, comprising an overhead conveyor for moving the poultry or part of a bird suspended by the legs, a guiding device disposed underneath the overhead conveyor for supporting and guiding the poultry, and a cutting device, functionally disposed behind a lead element for the poultry and which is part of the guiding device.

BACKGROUND

An apparatus is known from EP-A-0 159 744, wherein the poultry is carried tail first over a guiding device, and during conveyance a rounded, pressure-applying component of the apparatus moves the poultry into a substantially horizontal position, with the tail directed upward. This enables the activation of a V-shaped cutting device by which the tail can be severed during the conveyance of the poultry.

A disadvantage of the known apparatus is that the pressure-applying component of the apparatus moving the poultry into the horizontal position is susceptible to contamination. Moreover, the functionality of the known apparatus is dependent on the weight and the dimensions of the poultry. This weight, together with the force exerted by the pressure-applying component of the apparatus determine the position of the tail while the same passes the V-shaped knife. As a result, the accuracy with which severing of the tail of the poultry is carried out on successive carcasses cannot be controlled.

Another disadvantage of the known apparatus is that the tails are removed while positioned above the carcass. This may result in contamination of the carcass.

A final important disadvantage of the known apparatus is that it can only be employed at the beginning of a leg-severing module.

SUMMARY OF THE INVENTION

The objects of the invention include the reduction of these disadvantages and the achievement of possible further advantages as will become apparent from the following description, or learned through practice of the invention.

To this end, the apparatus according to the invention is characterized in that the overhead conveyor is designed to convey the poultry with the back facing forward, in that the guiding device supports and guides the poultry substantially at the side of the back, and that the cutting device is disposed in or under an effective supporting surface of the guiding device. The poultry conveyed through the apparatus may consist of a back portion and legs, but may also consist of a complete carcass with or without wings, and with or without other parts.

The invention has resulted in a trouble-free apparatus, which compared with the prior art, is especially simple and with which better results can be achieved.

The apparatus according to the invention makes efficient use of the gravitational force and the fact known to the person skilled in the art, that the tail of the poultry is to be found at the back. Due to the guiding device according to the invention supporting the poultry at the side of the back, the tail becomes positioned at the same height as or lower than the back so as to make it easily accessible for removal with the cutting device disposed in or under an effective supporting surface of the guiding device. In this way, the pressure-applying component of the apparatus placed on a springy support, which is used in the prior art, becomes unnecessary. Since this component is abandoned, a weight-independent working of the apparatus is ensured, and the apparatus is allowed to work without spring-activated movement depending on that weight. It is further clear that the severed tails do not become detached above the poultry but below it, and as a consequence the place where they drop can be controlled. The apparatus according to the invention has further the considerable advantage that it can be employed on its own without the prerequisite that the apparatus be used in combination with, for example, a leg severing module. Insofar necessary, the apparatus according to the invention can be cleaned very easily.

Conveniently, the effective supporting surface of the guiding device is provided with a slot for catching the tail of the poultry.

Preceding the effective supporting surface, the guiding device is further preferably provided with a sloping face for lifting the poultry during coneyance, and for this sloping face to be provided with a feed-through opening for the tail, which feed-through opening is succeeded by the slot. This is an operationally safe manner for presenting the tail at the beginning of the slot, since during the movement over the sloping face, the tail has the tendency to become inserted into the feed-through opening provided therein.

A further advantageous aspect of the invention is that the slot narrows relative to the feed-through opening such that during conveyance of the poultry, a frictional force is exerted on the tail. This achieves that the tail becomes pulled in the direction of the back, thereby pushing as much meat as possible toward the carcass of the poultry. In this way the least possible amount of meat is cut off when the tail is severed.

Conveniently, the lead element is pointed with a groove that widens and deepens in the direction of conveyance of the poultry. For one thing, any broken wings that, during the supply of the carcass of the poultry via the lead element, may be positioned underneath the carcass are thus pushed away sideways. For another thing, carcasses or parts of carcasses that are conveyed suspended by one leg are taken out of range and kept away from the feed-through opening, thereby reducing the risk of obstruction and disruption.

The apparatus according to the invention may suitably be embodied with a cutting device that comprises at least one stationary knife.

In a preferred embodiment of the apparatus according to the invention, it is however desirable for the cutting device to comprise at least one rotating knife. This makes the apparatus better resistant against obstruction caused by parts severed from the poultry. In addition, with such a rotating knife, a cleaner cut may be obtained without fraying.

The invention will be further elucidated herein below, by way of preferred embodiments of the apparatus according to the invention that do not limit the appended claims, and with reference to the drawing.

BRIEF DESCRIPTION OF THE DRAWINGS

In the drawing

Similar parts in the figures carry identical reference numerals.

DETAILED DESCRIPTION

Figure 1:
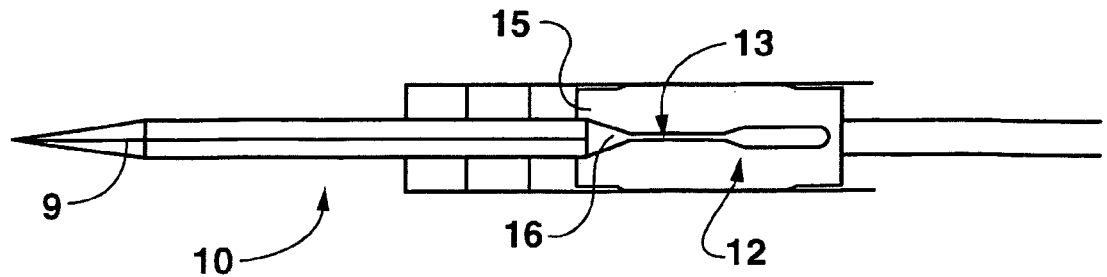
FIGS. 1 and 2 show the apparatus according to the invention in a top and side view, respectively.

Reference will now be made to embodiments of the invention, one or more examples of which are shown in the drawings. The embodiments are presented by way of explanation of the invention, and not meant as a limitation of the invention. It is intended that the invention include modifications and variations to the embodiments described or illustrated herein.

Reference numeral 1 generally indicates the apparatus for automatically removing a tail of poultry in accordance with the invention.

This apparatus 1 comprises an overhead conveyor 2 for moving the poultry 3 suspended by the legs.

Figure 2:
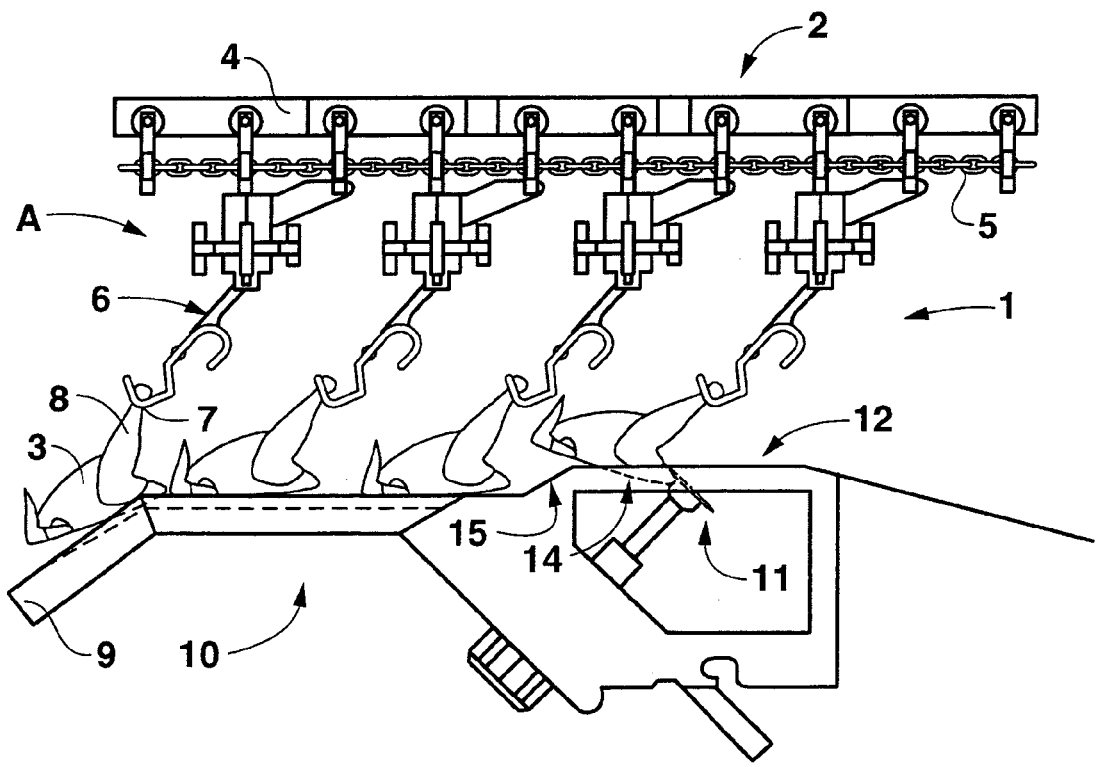

In a manner known to the person skilled in the art, the overhead conveyor 2 comprises a guide rail 4, and hooks 6 with holders 7 for receiving the legs 8 of the poultry that are to be moved along this guide rail 4 with the aid of a chain path 5, as is clearly depicted in FIG. 2.

As also shown in FIG. 2, the poultry 3 is conveyed in the direction of arrow A such that the back of the poultry faces forward and the breast faces rearward.

When the poultry 3 arrives at the apparatus 1, the back of the poultry 3 is received by the lead element 9 that forms part of a guiding device 10 disposed under the overhead conveyor 2, which serves to support and guide the poultry 3 while the poultry 3 passes through the apparatus 1. From FIG. 1 in combination with FIG. 2, it can be clearly seen that the lead element 9 in this illustrated embodiment is pointed, with a groove that widens and deepens in the feed-through direction of the poultry, and exits into the feed-through opening 16 to be discussed later, into which the tail of the poultry can reach.

FIG. 2 further shows that the apparatus 1 is provided with a cutting device 11, functionally disposed near the exit end of the guiding device 10.

FIG. 2 also clearly shows that the guiding device 10 supports and guides the poultry substantially at the side of the back, and that the cutting device 11 is provided in or under an effective supporting surface 12 of the guiding device 10.

FIG. 1 clearly shows that the above-mentioned effective supporting surface 12 of the guiding device 10 is provided with a groove 13 serving to catch the tail 14 of the poultry 3.

To assist the function of this slot 13, it is expedient for the guiding device 10 to be provided with a sloping face 15 preceding the effective supporting surface 12 so that during conveyance, the poultry 3 is lifted, Further, in the sloping face 15 a feed-through opening 16 (see FIG. 1) is provided, into which the tail 14 can reach, and which feed-through opening 16 is succeeded by the slot 13. When the poultry is being conveyed over the guiding device 10, the tail 14 is inserted into said feed-through opening 16, such that is can subsequently be effectively caught in the slot 13.

FIG. 1 shows that the slot 13 narrows relative to the feed-through opening 16. This causes the slot 13 to exert a frictional force on the tail 14, resulting in the tail 14 being pulled to the side of the back of the poultry while the meat in that area is pushed towards the carcass of the poultry 3. The subsequent severing of the tail 14 by means of the cutting device 11 may thus take place with as little loss of meat as possible.

Although, as mentioned above, the cutting device 11 may be embodied with a stationary knife. For example, in FIG. 4 a stationary knife is depicted in dashed lines below the slot in the supporting surface 12 to engage and cut the tail 14 as the poultry carcass 3 is conveyed along the surface. In the preferred embodiment shown, the cutting device 11 is embodied as a rotating knife. This was shown to produce cleaner cuts and to avoid fraying of the skin of the poultry.

Figure 3:
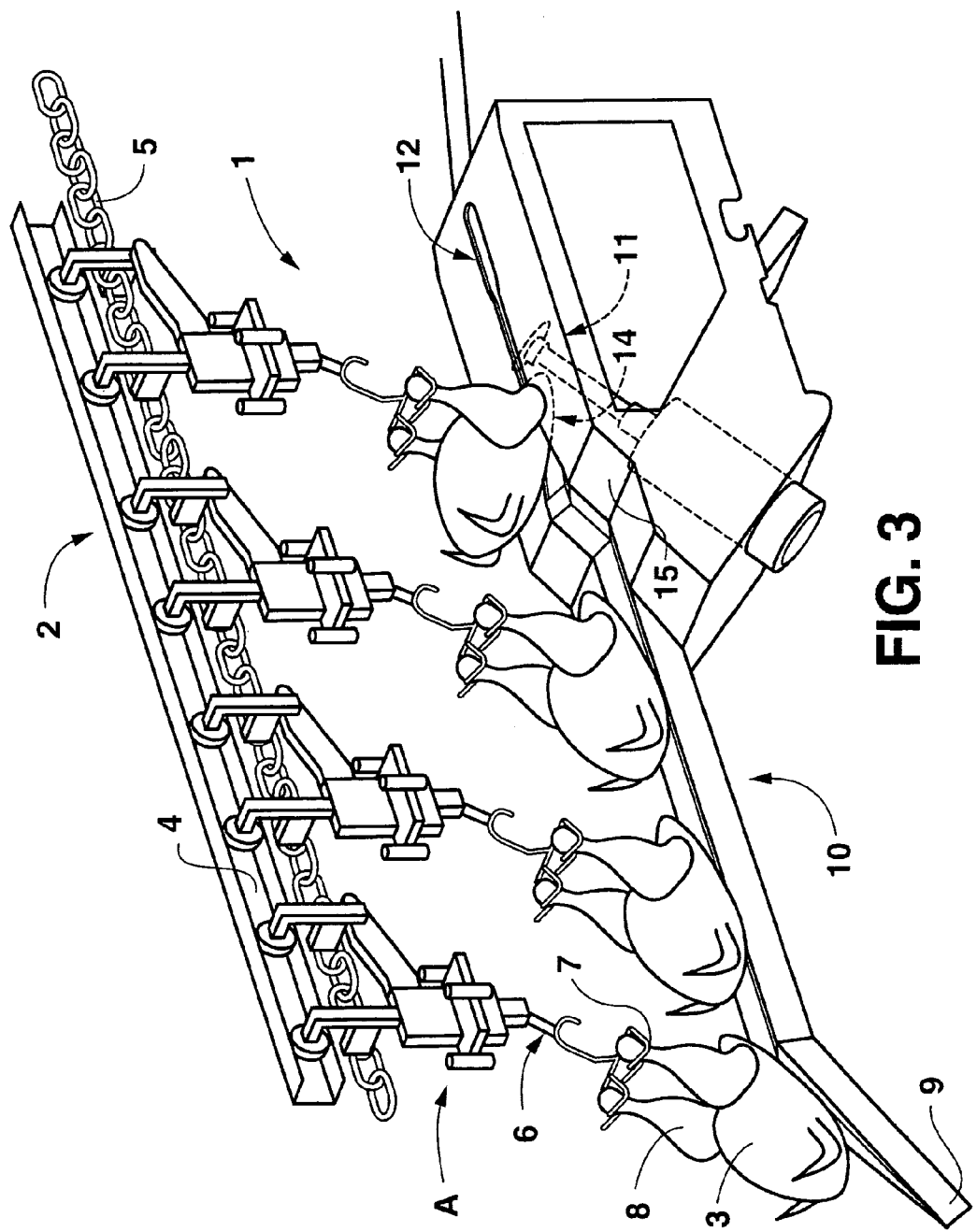
FIGS. 3 and 4 are perspective operational views of the apparatus shown in FIGS. 1 and 2.
Figure 4:
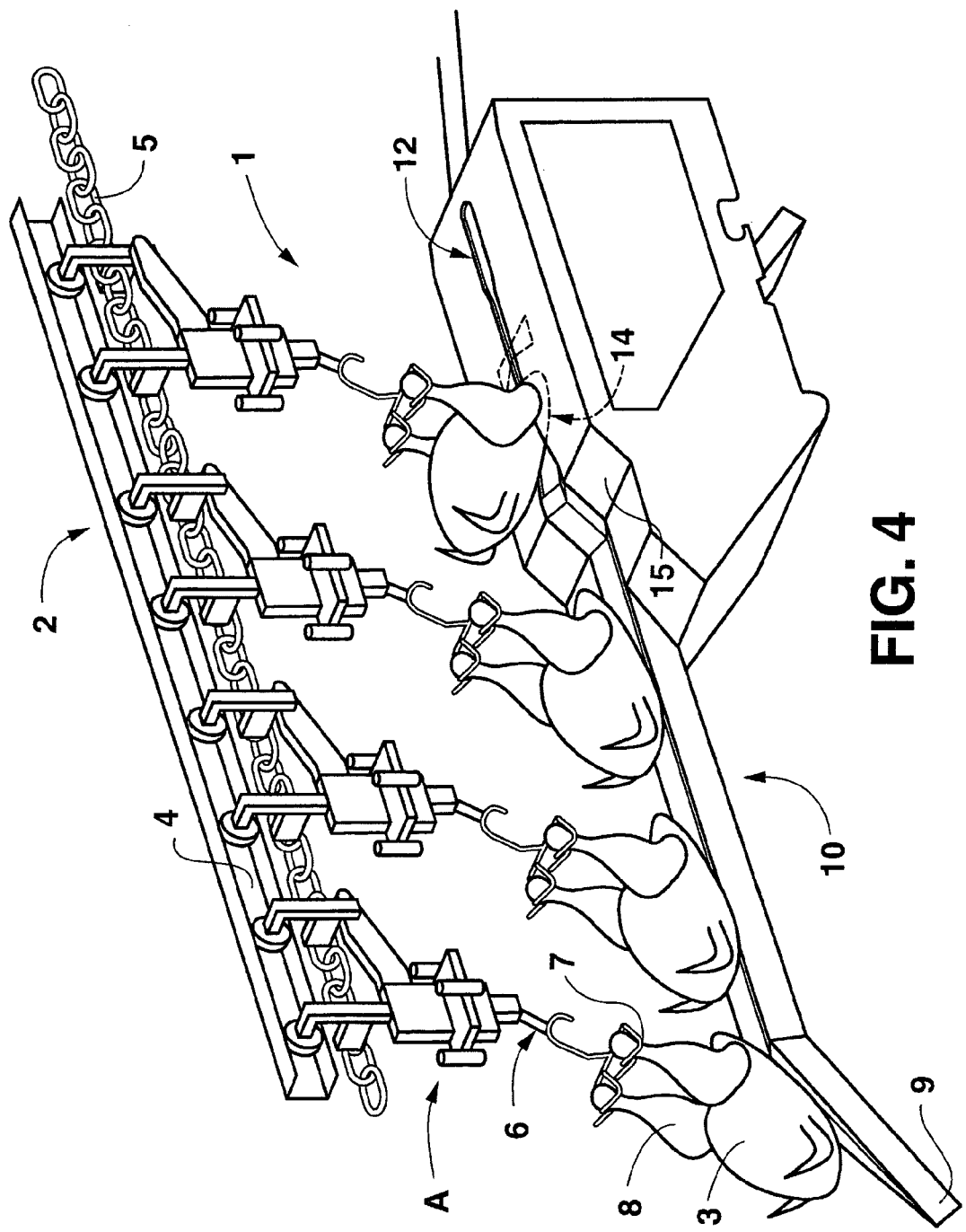

FIGS. 3 and 4 provide perspective view of the apparatus of FIGS. 1 and 2, and more clearly illustrate certain of the structural features of the apparatus. For example, the structure and interaction of the groove in the lead element 9, sloping face 15, feed-through opening 16, and slot 13 are more readily seen.

It should be appreciated by those skilled in the art that various modifications and variations can be made to the embodiments of the invention described herein without departing from the scope and spirit of the appended claims and their equivalents.

The invention claimed is:

1. An automated apparatus for automatically removing a tail from poultry, comprising:
    an overhead conveyor from which the poultry is suspended and conveyed with its tail oriented and leading in a conveying direction of said conveyor;
    a guiding device disposed under said overhead conveyor at a position to support and guide the poultry as it is conveyed overhead;
    said guiding device comprising a support surface disposed so as to engage the poultry's tail and support the back of the poultry as the poultry is conveyed overhead so that the poultry's tail is positioned at the same height or lower than a plane of said support surface along which the poultry's back is supported and conveyed; and
    a cutting device disposed relative to said support surface to cut the tail from the poultry at or below said plane of said support surface as the poultry is conveyed along said support surface.

2. The apparatus as in claim 1, wherein said support surface comprises a slot disposed so as to catch the poultry's tail as the poultry is conveyed along said support surface.

3. The apparatus as in claim 2, wherein said guiding device further comprises a sloped face before said support surface in a conveying direction of said conveyor and oriented so as to lift the poultry, said sloped face further comprising a feed-through opening preceding said slot for receipt of the poultry's tail.

4. The apparatus as in claim 3, wherein said slot narrows relative to said feed-through opening in a conveying direction of said conveyor such that a frictional force is exerted on the poultry's tail in said slot.

5. The apparatus as in claim 1, wherein said guiding device further comprises a lead element having a groove that widens and deepens in a conveying direction of said conveyor.

6. The apparatus as in claim 1, wherein said cutting device comprises a stationary knife.

7. The apparatus as in claim 1, wherein said cutting device comprises a rotating knife.

* * * * *